March 15, 1949.  C. B. WILLIAMS, JR  2,464,540
METHOD AND APPARATUS FOR PRODUCING
LAMINATED SAFETY GLASS
Filed Dec. 11, 1944  2 Sheets-Sheet 1
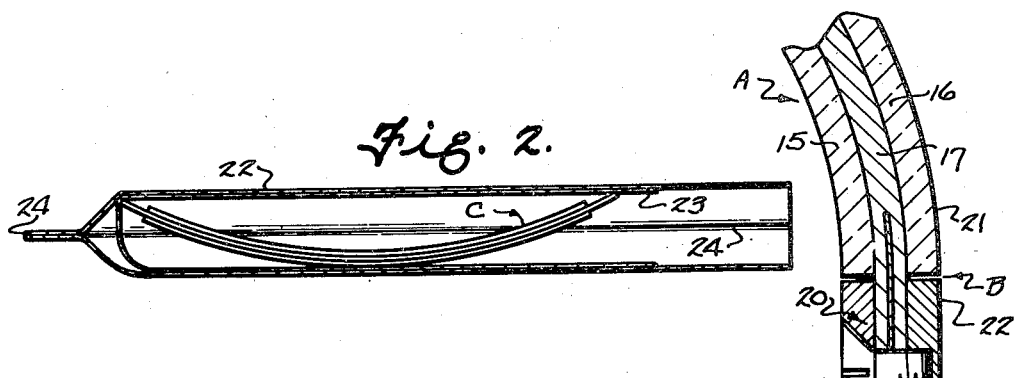
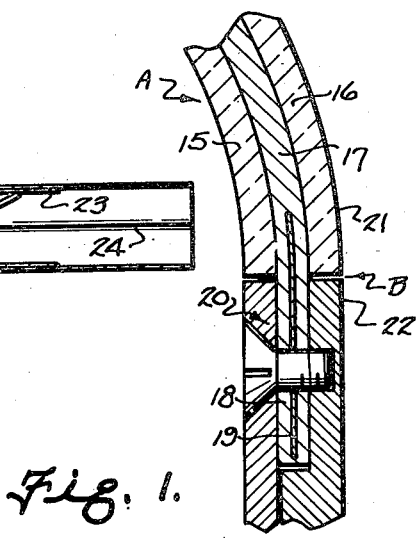
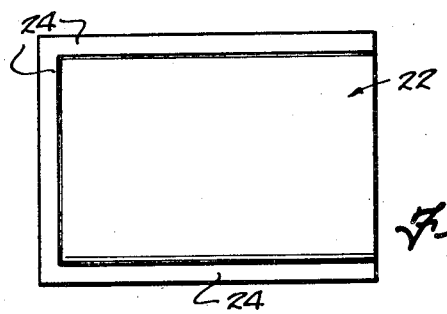
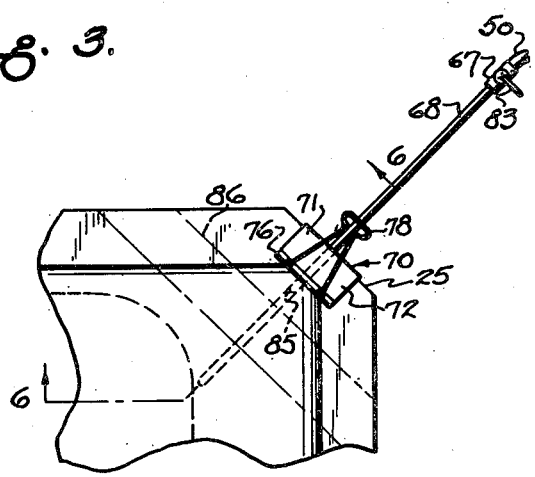
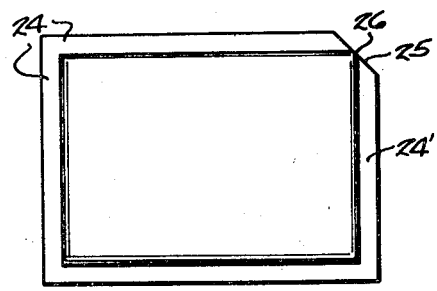
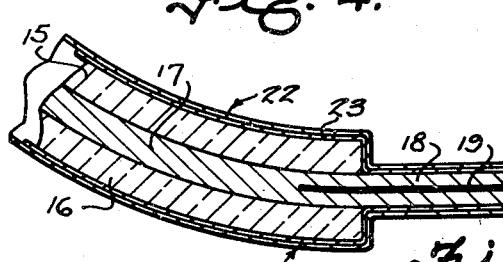
Inventor
CARL B. WILLIAMS JR.
Frank Fraser
Attorney March 15, 1949.    C. B. WILLIAMS, JR    2,464,540
METHOD AND APPARATUS FOR PRODUCING
LAMINATED SAFETY GLASS
Filed Dec. 11, 1944    2 Sheets-Sheet 2

Inventor
CARL B. WILLIAMS JR.
By Frank Fraser
Attorney

Patented Mar. 15, 1949

2,464,540

UNITED STATES PATENT OFFICE 2,464,540

METHOD AND APPARATUS FOR PRODUCING LAMINATED SAFETY GLASS

Carl B. Williams, Jr., Toledo, Ohio, assignor to Libbey-Owens-Ford Glass Company, Toledo, Ohio, a corporation of Ohio Application December 11, 1944, Serial No. 567,740

3 Claims. (Cl. 154—2.72)

The present invention relates to the manufacture of laminated safety glass and more particularly to a method of and apparatus for exhausting air from containers into which the assembled laminations are placed prior to the pressing or laminating operation.

Generally speaking, laminated glass is composed of two or more sheets of glass and one or more layers of non-brittle plastic material all bonded together into a composite structure. In regular commercial practice the final compositing or bonding together of the assembled laminations is usually effected in an autoclave, by the action of a heated fluid under pressure.

When flat or only slightly bent glass sheets are combined with a relatively thin plastic interlayer that is of the same area as the glass, it is possible to close an assembly of such laminations, to an extent sufficient to prevent ingress of the autoclave fluid therebetween, by a preliminary pressure of the glass-plastic sandwich between rolls or in a platen press. In these circumstances, the prepressed sandwich can be placed unprotected in the autoclave for final pressing.

However, the pressing fluid ordinarily used for laminating glass is a petroleum type oil, and pressures of around 225 pounds per square inch, with temperatures of about 260 degrees Fahrenheit, maintained for 15-minute periods, are commonly employed to provide the heat and pressure necessary to permanently unite the laminations together. For this reason there are some types of glass-plastic sandwiches that cannot be treated in the direct and relatively simple manner outlined above.

Chief among these are the so-called extended plastic type units, now widely used in the glazing of aircraft. These units are quite similar to regular laminated glass, except for the fact that they have comparatively thick plastic interlayers which are of greater area than the glass sheets and extend outwardly therebeyond to provide a flexible attaching and sealing flange around the unit.

Now when a glass and plastic sandwich of this sort is placed unprotected in the autoclave, the action of the hot oil under pressure on the projecting flange will result in serious loss of plasticizer therefrom, together with wrinkling and distortion, if not actual disintegration of the exposed plastic.

In the case of bent glass laminations too, and particularly those with bends in two directions, unsatisfactory results may be obtained when the bent glass-plastic sandwiches are exposed directly to the fluid in the autoclave, because it is difficult to properly close these sandwiches by preliminary mechanical pressure to an extent that will prevent the heated autoclave fluid from being forced between the laminations when it is placed under pressure.

It has already been suggested that laminated safety glass of these and other special types be protected from direct contact with the fluid in the autoclave during the final pressing operation by wrapping, or enclosing them in thin, transparent, flexible sheet material, such as polyvinyl alcohol or cellophane, which can be readily sealed to itself to provide a fluid tight container.

A primary object of this invention is to provide a method of evacuating air from a continuous succession of such containers so that assembled sandwiches to be composited can be enclosed in the sheeting, the resulting containers with the sandwiches inside evacuated, and the protected sandwiches then introduced into the autoclave, all in a substantially continuous manner.

A further object is the provision of apparatus for conveying the filled containers from the loading station to the autoclave, and for exhausting the air from said containers during movement along the conveying apparatus.

Another object is the provision, in apparatus of the above character, of means located near the end of the conveying means for sealing off the inside of the containers from the air exhausting means before introducing said containers into the autoclave.

Other objects and advantages of the invention will become more apparent during the course of the following description, when taken in connection with the accompanying drawings.

In the drawings, wherein like numerals are employed to designate like parts throughout the same:

Fig. 1 is a fragmentary sectional view through a laminated safety glass unit of the extended plastic type, showing it mounted in the sight opening of an airplane;

Fig. 2 is a longitudinal sectional view of one of the flexible protective containers with an assembled glass-plastic sandwich inside;

Fig. 3 is a plan view of the container of Fig. 2;

Fig. 4 is a view similar to Fig. 3 after the open end of the container has been sealed shut and an opening provided for the air exhausting means;

Fig. 5 is an enlarged fragmentary view of the upper right hand corner of Fig. 4, showing the air exhausting means in place;

Fig. 6 is a section taken substantially along the line 6—6 in Fig. 5;

Figure 7:
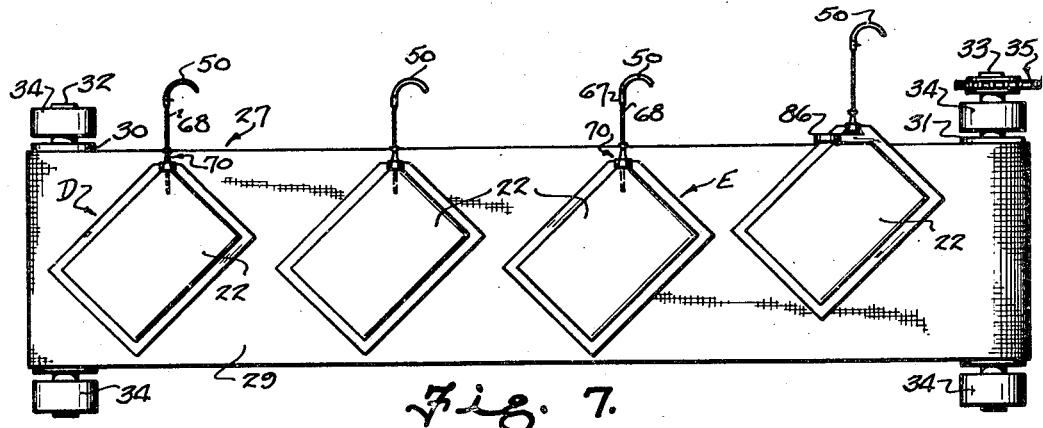
Fig. 7 is a plan view of the conveyor upon which the sealed containers are moved from the loading station to the autoclave, with a number of containers thereon in various stages of evacuation.

With more detailed reference to the drawings, there has been illustrated in Fig. 1 a laminated safety glass unit A of the extended plastic type, mounted in the sight opening B of an airplane. The unit A is a bent or curved one and comprises two sheets of glass 15 and 16, with an interposed layer of a relatively soft and resilient thermoplastic material 17. An interlayer 17 that is of greater area than the glass sheets is used so that it will extend outwardly beyond the edges of the glass as at 18 to provide a flexible attaching and sealing flange, and this flange may be reinforced by a thin flexible metal collar or frame 19 embedded therein.

As shown, this sort of laminated, transparent closure unit is adapted to be mounted in a sight opening by clamping the extended plastic flange 18 between the jaws of a clamping frame 20, surrounding the opening B, to give a flush type mounting. In other words, the outer surface 21 of the closure unit or window will be flush with the outside wall 22 of the ship, and so will offer no interruption to the streamlined surface of the plane. At the same time, because the plastic attaching flange is the only part of the window that is securely anchored in place, the glass or breakable part of the unit will have a certain freedom of movement within the opening, and for that reason will be considerably less likely to fracture under the stresses, strains and pressure differentials encountered in flying.

In producing the type of laminated glass unit just described, the various laminations are first assembled together in proper superimposed relationship to form a sandwich such as is shown at C in Fig. 2. The outside sheets 15 and 16 may be either sheet, plate, or heat treated glass. Or one or both of them may be of a relatively hard type of transparent plastic such as Plexiglas, Lucite, etc. The interlayer 17 is preferably a polyvinyl butyr acetal resin plasticized with 37½ parts of dibutyl sebacate per 100 parts of resin by weight, but different plastics of varying thickness and physical characteristics, chosen from the several classes of resins, cellulosic derivatives and the like, may also be satisfactorily employed. One advantage in using suitably plasticized polyvinyl acetal resins as interlayers, is that these plastics do not require an adhesive but will bond directly to cleaned glass sheets upon application of heat and pressure alone.

After the sandwich C has been assembled it is introduced into a flexible container, such as indicated by the numeral 22 in Fig. 2 and which is especially designed to protect the sandwich from direct contact with the autoclave fluid. In order to prevent squeezing out or deformation of the extended plastic during autoclaving it is sometimes desirable to wrap the sandwich, before putting it in the container 22, in material such as heavy paper which has been treated to prevent its sticking to the plastic. Such a wrapping material has been indicated at 23.

The container 22 may be made of any thin, transparent, flexible sheet material that is impervious to the autoclave fluid and that can be readily sealed to itself. A material of this kind that can be instantly sealed to itself by the application of heat and pressure is probably the most satisfactory, and the laminated, lacquer-coated cellophane sheeting disclosed in the co-pending application of James H. Boicey, Serial No. 566,337, filed December 2, 1944, is such a material.

The containers 22 are preferably made by placing two sheets of a transparent thermosealing material of this sort, one on top of the other, and then sealing the marginal portions of the superimposed sheets together around three sides as shown at 24 in Figs. 2 and 3. The sealing may be done by running a hot pressing iron over the parts to be sealed, or by passing the marginal portions of the superimposed sheets between pairs of heated pressure rolls.

It is of course desirable that the containers 22 be preformed so that there is always a supply available to receive the glass-plastic sandwiches C as fast as they can be assembled. Coming from the assemblers in the production line, each successive sandwich is first wrapped loosely in a sheet of the paper 23, and then inserted into a container 22 as illustrated in Fig. 2. The fourth or open side of the container is then sealed up as at 24' (Fig. 4) to completely close it, after which one corner is cut off as at 25, far enough back to provide a small opening 26 leading into the interior of the container for the reception of the evacuating means.

One of the advantages of the present invention is the fact that the glass and plastic sandwiches can be assembled; placed in the transparent, flexible containers; and the containers sealed, exhausted of air and then resealed; all in a substantially continuous operation ending with the protected sandwich ready to be placed in the autoclave. The steps of assembling the laminations, inserting them into the containers, sealing up the containers and forming the opening for the evacuating means can all be performed as the sandwiches are being continuously moved along on a suitable conveyor forming part of a production line (not shown). In addition, this invention makes it possible to also exhaust the air from the containers while continuing, and without interrupting, their movement toward the autoclave.

The apparatus for effecting this result is best shown in Figs. 5 to 10 and comprises essentially a conveyor 27 (Figs. 7 and 9) for the filled containers 22, and an overhead evacuating set-up 28 (Figs. 8 and 9) for exhausting the air from the containers as they are carried along by the conveyor.

The conveyor 27 includes an endless belt 29, trained about a pair of horizontally arranged drums 30 and 31, carried by shafts 32 and 33 journaled in bearings 34. A suitable chain and sprocket drive 35 is associated with one end of the shaft 33 to drive the conveyor, and the conveyor itself is preferably arranged with its discharge or right hand end adjacent to an autoclave (not shown) in which the final pressing is to be accomplished.

Figures 9, 10:
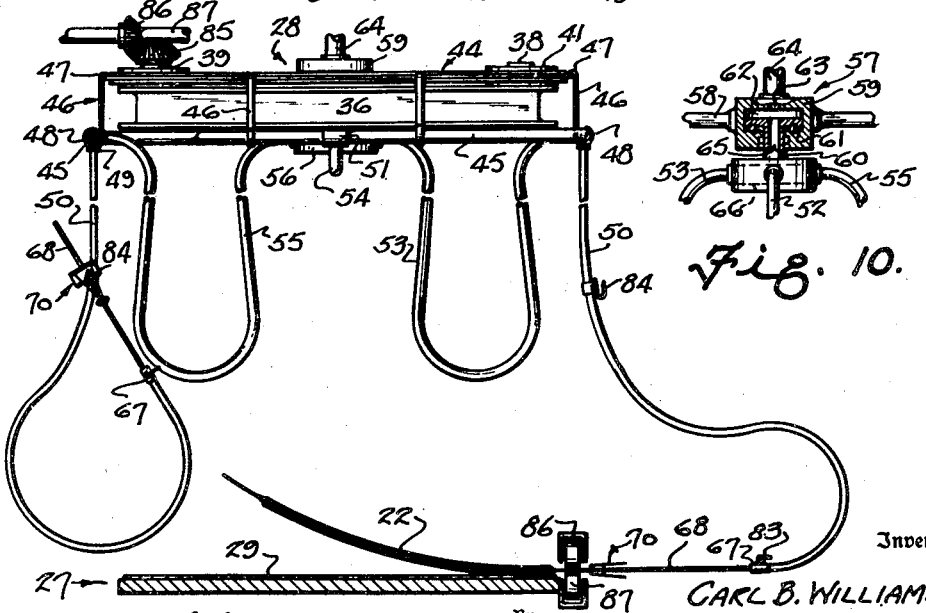
Fig. 9 is an end view, partially in section, of the apparatus shown in Figs. 7 and 8, including the means for sealing off the interior of the containers from the exhausting means.
Fig. 10 is a section taken substantially on the line 10—10 in Fig. 8.

The overhead evacuating apparatus comprises an open, substantially rectangular, channel iron frame 36, suspended directly above the conveyor 27 (Fig. 9). Rotatably mounted in bearings located at the four inside corners of the frame 36 are stub shafts 37, 38, 39 and 40 carrying sprocket wheels 41, about which is trained an endless chain 44. This chain 44 supports and carries a flexible, endless hose or conduit 45, of the same length as itself, by means of a series of hooks or the like 46 equally spaced along the length of the chain. The hooks 46 have oppositely turned hook portions 47 and 48 adjacent their two ends, the upper hook portion 47 being hooked onto the chain 44, while the lower hooked portion supports the flexible conduit 45.

Hanging downwardly from suitable connections 49 equidistantly spaced along the flexible conduit 45, are a plurality of flexible hoses 50 which are adapted to be placed in communication with the containers 22 on the conveyor 27 in a manner to be more clearly hereinafter set forth. Also connected to and communicating with the flexible conduit 45, through another set of equally spaced connections 51 are four more flexible hoses 52, 53, 54 and 55 leading to the lower portion 56 of an air manifold 57 mounted on a cross brace 58 for the frame 36.

The air manifold 57 consists essentially of an upper stationary portion 59 carried by the cross brace 58, and the lower portion 56 that is rotatably mounted in the upper portion by a stem 60 and ball bearings 61. The upper portion 59 is provided with an air chamber 62, connected through an opening 63 with a pipe 64 leading to an air pump or the like (not shown), and also connected through a passage 65 in the stem 61, and an air chamber 66 in the lower portion 56, with the flexible hoses 52 to 55 leading to the conduit 45.

In this way, when the air pump or other exhausting means is in operation, a constant vacuum will be applied to the hoses 50 which, as pointed out above, are adapted to be connected to the containers 22 on the conveyor 27, and to exhaust the air therefrom as they move toward the autoclave. The way in which the flexible hoses 50 are placed in communication with the containers, and the apparatus for doing this, is best shown in Figs. 5 and 6. Preferably there is connected to each hose 50, by means of a connection 67, a tube 68 for insertion into the opening 26 in a container 22, and through which the air is exhausted. This tube 68 is simply a long slender brass cylinder having one open and one closed end, and provided with a plurality of small openings 69 in its side walls adjacent the closed end. These openings are provided in the side of the cylinder, instead of a single opening there or in the end, to eliminate the possibility of the apparatus being rendered ineffective by accidental blocking of one opening.

In order to close the opening 26 around the tube 68 there is associated with the tube a clamping member 70. The clamping member is very similar in construction to a large paper clamp, having a substantially U-shaped spring steel body portion 71, with the legs 72 and 73 of the U being constantly urged toward one another by the spring tension of the metal. The legs 72 and 73 thus form the jaws of the clamp and are lined on their inner sides with heavy pieces of rubber or other resilient material 74 and 75. Their outer ends are rolled back as at 76 to receive the bent ends 77 of the looped handle members 78 and 79. The handle members extend outwardly beyond the rear of the body portion 71 to form levers which, when engaged and pressed by the hand of the operator, will force open the jaws 72 and 73 of the clamp.

The tube 68 is associated with the clamp member 70 by simply sliding it through an opening 80 in the rear side 81 of the body portion of the clamp, and also through a cylindrical channel 82 cut in the two rubber facing strips 74 and 75. This channel 82 is large enough to permit the tube 68 to slide therein, but is actually smaller than the diameter of the tube so that the space around it will be tightly sealed whenever the jaws of the clamp are closed.

In order to operatively connect the interior of a container 22 with the evacuating means, the tube 68 is first slipped into the opening 26 at the corner of the containers and the jaws of the clamp 70 caused to grip the walls of the container, as shown in Fig. 6, to tightly seal the opening around the tube. The tube 68 is then slid farther into the container until it is just about in contact with the edge of the sandwich C (dotted lines in Fig. 5).

Communication between the tubes 68 and the air exhausting means can be established or cut off by means of a valve 83 in the hose connection 67, and hooks 84 are provided on each of the hoses 50 (Fig. 9) on which their respective tubes 68 and associated clamp means 70 can be hung when not in use.

Figure 8:
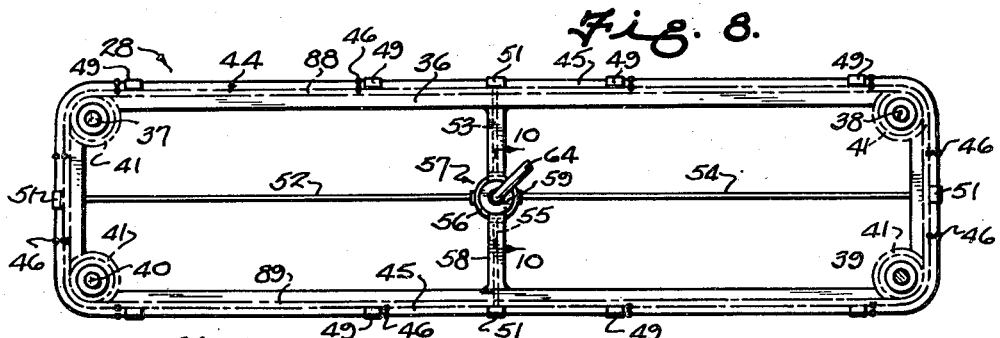
Fig. 8 is a top plan view of that part of the air exhausting means, which makes is possible to evacuate a continuous succession of moving containers during movement of the containers between two spaced points in their travel on the conveyor of Fig. 7.

The chain 44 is driven in the direction of the arrow in Fig. 8 at the same linear speed as the conveyor 27 by means of a bevel gear 85 keyed to the upper end of the shaft 39 and meshing with a second bevel gear 86 which in turn is keyed to a shaft 87 driven from any suitable source of power. Thus, the run 88 of chain 44, at the top of Fig. 8 and at the right hand side of Fig. 9, will travel in the same direction and at the same speed as the conveyor 27; while the run 89 of chain 44, at the bottom of Fig. 8 and at the left hand side of Fig. 9, will be the return run traveling in a direction opposite to that of the conveyor. Movement of the chain 44 of course results in identical movement of the conduit 45 and, because of the hoses 52 to 55 connecting the conduit 45 with the lower movable portion 56 of the air manifold 57, the portion 56 will rotate with the travel of the conduit thereabout.

Enough hoses 50 are provided so that there will be one available from that part of the conduit 45 lying below the run 88 of the chain, to each of as many filled containers 22 as can be placed on the conveyor 27. The hoses 50 are of such length that the tubes 68 and clamps 70 can be readily associated with the containers 22 in the manner shown in Figs. 5 and 7, and at the right hand side of Fig. 9, as they move along with the conveyor 27.

In operation filled containers 22, sealed on four sides and with one corner cut back to form the opening 26 leading to the interior as shown in Fig. 4, are placed on the left hand end of the conveyor as fast as they are prepared. An operator then takes the nearest tube-clamp combination off of its hook 84, inserts the tube 68 into the opening 26 in the container, and puts the clamp 70 in position to clamp the walls of the container around the tube and close the opening. At the same time the operator opens the valve 83 applying vacuum to the interior of the container 22.

There will be a continuous suction exerted on the container during the time that it is moving from loading position D to position E on the conveyor, by which time all the air will have been exhausted.

In this connection, the containers 22, as pointed out above are preferably made of a transparent material that is thin enough to conform exactly to the contour of the sandwich (see Fig. 6) when all of the air has been drawn out. Consequently by looking at the sandwich through the thin transparent walls of the container, the operator can tell with certainty when all of the air has been exhausted and in fact can actually see an increasing transparency or "clearing up" develop in the sandwich itself, which is the sign of adhesion between the laminations.

This latter condition is due to the fact that when the air is properly exhausted from the inside of the container the pressure of the atmosphere will compress the sandwich to an extent sufficient to give a bonding of the laminations, and no other preliminary or prepressing operation is required with this method. Indeed, for some purposes this atmospheric pressure may be sufficient without subjecting the sandwich to additional pressure in the autoclave.

The distance between station D and station E is made such that complete exhaustion of the air will be obtained by the time the container reaches the latter point, and the next move is to remove the tube and clamp, and to seal up the opening in the container without losing the vacuum. To do this, it is only necessary to slide the tube 68 back, until the end of it is at the point indicated at 85 in Fig. 5, leaving the valve 83 still open, and without disturbing or releasing the clamp 70. Then, while still maintaining the vacuum on the interior of the container, it is sealed off in front of the tube along the path indicated at 86 in Fig. 5.

This sealing off may be done in the same manner as the edges of the container were sealed and a preferred way is to pass the corner of the container between a pair of heated rolls 86 and 87 mounted adjacent the end of the conveyor 27, as shown in Figs. 7 and 9. As soon as this sealing off step has been accomplished the clamp 70 can be released and the tube 68 slid entirely out of the container, without in any way effecting the conditions inside. The clamp and tube are then hung on their hook 84 for the return journey to the charging end of the conveyor.

At this point the enclosed sandwiches can be lifted from the conveyor as fast as they arrive and are ready for the autoclave. They will be found to be covered all over by a skin tight sheet of light, transparent material, and can be treated and handled in the same way as prepressed and unprotected sandwiches. Nevertheless, when evacuated and sealed as described above, the containers 22 will be completely oil-proof even at autoclaving temperatures. As a result the sandwich although protected from direct contact with the autoclave fluid will at the same time have substantially the same advantages as an unprotected one so far as perfectly equalized pressure at all points, and quick heat transfer during the various temperature cycles employed is concerned.

It will be noted that with the method and apparatus described here, sandwiches to be pressed can be bagged or wrapped, evacuated and finally sealed without interrupting their continuous movement from the time of assembly until they are ready for the autoclave.

The form of the invention herewith shown and described is to be taken as the preferred embodiment of the same, but it is to be understood that various changes in the shape, size and arrangement of parts may be resorted to without departing from the spirit of the invention or the scope of the subjoined claims.

I claim:

1. Apparatus for use in the pressing of laminated glass comprising a conveyor adapted to carry a plurality of flexible containers for glass-plastic sandwiches, air exhausting apparatus spaced from said conveyor and including a stationary portion connected to a source of vacuum and a movable portion communicating with said stationary portion and movable therearound in the plane of movement of said conveyor, means for placing said movable portion in communication with one of the flexible containers on said conveyor comprising an evacuating tube flexibly connected with said movable portion for insertion into an opening in said container and clamping means on said tube for clamping a portion of the walls of the flexible container around said tube to close the opening therearound, a pair of heated rolls cooperating with the delivery end of the conveyor for sealing said opening prior to removal of said tube and clamping means, and means for driving the conveyor and said movable portion of the air exhausting apparatus in unison.

2. In a method of producing laminated composite structures made up of a plurality of laminations all bonded together into a unitary whole by the action of heat and pressure, the steps of placing successive sandwiches of said laminations assembled in proper superimposed relationship into flexible containers which conform exactly to the shape of said sandwiches under vacuum, closing said containers, conveying successive filled and closed containers continuously along a predetermined path, inserting an evacuating implement through an opening formed in each successive closed container while it is moving along said path, clamping the walls of the containers around said implement to temporarily close said opening around the implement, applying suction to the interior of said container through said implement, continuing said suction during travel of successive containers along said path until the laminations are bonded together, sealing off the interior of the container between said sandwich and said evacuating implement as each successive container approaches the end of said predetermined path, and then removing said clamping means and said evacuating implement.

3. In a method of producing laminated composite structures made up of a plurality of laminations all bonded together into a unitary whole by the action of heat and pressure, the steps of placing successive sandwiches of said laminations assembled in proper superimposed relationship into flexible containers which conform exactly to the shape of said sandwiches under vacuum, closing said containers, conveying successive filled and closed containers continuously along a predetermined path, inserting an evacuating implement through an opening formed in each successive closed container while it is moving along said path, clamping the walls of the containers around said implement to temporarily close said opening around the implement, applying suction to the interior of said container through said implement, continuing said suction during travel of successive containers along said path until the laminations are bonded together, partially withdrawing the evacuating implement from each successive container as it approaches the end of said predetermined path while continuing the application of suction to the interior of said container, sealing off the interior of each successive container between said sandwich and the partially withdrawn evacuating implement, and then removing said clamping means and said evacuating implement.

CARL B. WILLIAMS, Jr.

REFERENCES CITED

The following references are of record in the file of this patent:

UNITED STATES PATENTS

| Number | Name | Date |
| --- | --- | --- |
| 2,028,916 | Owen | Jan. 28, 1936 |
| 2,145,941 | Maxfield | Feb. 7, 1939 |
| 2,281,187 | Waters | Apr. 28, 1942 |
| 2,374,040 | Ryan | Apr. 17, 1945 |
| 2,391,373 | Wickstrum | Dec. 18, 1945 |